July 2, 1935.  W. A. CHRYST  2,006,789

SHOCK ABSORBER

Filed June 12, 1931  3 Sheets-Sheet 1

July 2, 1935.  W. A. CHRYST  2,006,789
SHOCK ABSORBER
Filed June 12, 1931  3 Sheets-Sheet 2

Fig. 7.  To 4 Shock Absorbers

Fig. 9.

Inventor
William A. Chryst
By Spencer, Hardman and Fehr
Attorneys

July 2, 1935.  W. A. CHRYST  2,006,789
SHOCK ABSORBER
Filed June 12, 1931  3 Sheets-Sheet 3

Inventor
William A. Chryst
By Spencer, Hardman and Fehr
Attorneys

Patented July 2, 1935

2,006,789

UNITED STATES PATENT OFFICE 2,006,789

SHOCK ABSORBER

William A. Chryst, Dayton, Ohio, assignor, by mesne assignments, to General Motors Corporation, Detroit, Mich., a corporation of Delaware Application June 12, 1931, Serial No. 543,854

39 Claims. (Cl. 188—88)

This invention relates to improvements in a device for controlling the relative movements between the frame and axles of a motor driven vehicle.

It is among the objects of the present invention to provide a device for controlling the relative movements between the frame and axles of a motor driven vehicle, said device being adapted to be controlled from the driver's seat by the operator of the vehicle.

Another object of the present invention is to provide a device of the type mentioned, adapted to be automatically controlled in accordance with the surface of the roadway over which said vehicle is being operated.

A further object of the present invention is to provide a device of the type mentioned with means adapted automatically to control said device in accordance with the speed at which the vehicle is being operated.

A still further object of the present invention is to provide a device of the type mentioned with automatically operable mechanism adapted to control said device in accordance with both the surface of the roadway over which the vehicle is being operated and the speed at which the vehicle is being operated, the device having also a hand operable member which is adapted either to limit the operation of the automatic controls or entirely to prevent their operation.

Further objects and advantages of the present invention will be apparent from the following description, reference being had to the accompanying drawings wherein a preferred embodiment of one form of the present invention is clearly shown.

Figure 1:
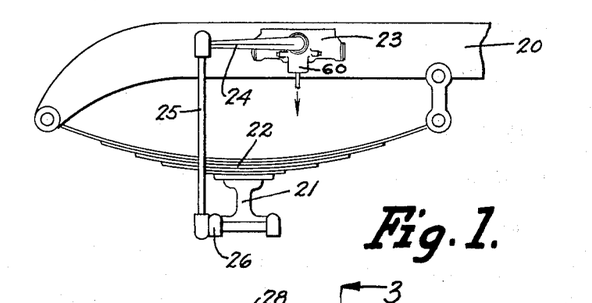
Fig. 1 is a fragmentary side view of a vehicle chassis, the road wheels being omitted for the sake of clearness, a shock absorber embodying the present invention being shown applied to the frame of the vehicle.
Figure 5:
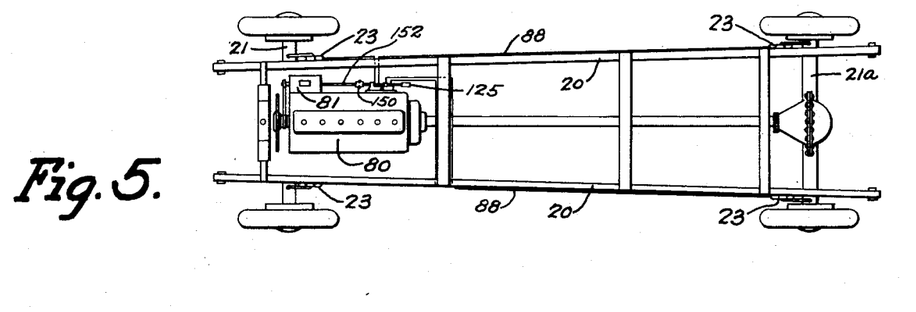
Fig. 5 is a plan view of the vehicle chassis showing the device of the present invention applied thereto.

Referring to the drawings and particularly to Figs. 1 and 5, which show the vehicle chassis, the numeral 20 designates the frame of the vehicle which is supported upon the front and rear axles 21 and 21a respectively by springs 22, one of which is shown in Fig. 1. The shock absorber, designated as a whole by numeral 23, is attached to the frame 20 and has an oscillatable operating arm 24, the free end of which is swivelly attached to one end of a link 25, the other end of said link being swivelly secured to a bracket 26 attached to the axle 21 in any suitable manner.

The shock absorbers of the present device are similar to the shock absorber illustrated, described and claimed in my copending application, Serial No. 542,909, filed June 8, 1931.

The shock absorber comprises a casing 27 providing a fluid reservoir 28 and a cylinder 29. The ends of the cylinder are closed by cylinder head caps 30 and 31 provided with proper gaskets to prevent leaks.

Within the cylinder there is provided a piston 32, having piston head portions 33 and 34 forming compression chambers 35 and 36 respectively, within the cylinder. The compression chamber 35 is termed "the spring compression control chamber", while chamber 36 is termed "the spring rebound control chamber". A space provided between the piston head portions 33 and 34 receives the piston operating lever 35a which is secured to or formed integral with the rocker shaft 37a journalled in the casing 27. The one end of the rocker shaft 37a extends outside the casing and has the operating arm 24 attached thereto. A suitable packing 37 prevents fluid leaks from the fluid chamber or reservoir 28 through the bearing supporting the shaft 37a. Wearpieces 38 and 39 are carried by the respective piston head portions 33 and 34 and are engaged by the operating lever or arm 35a. Each piston head portion 33 and 34 has a longitudinal passage screw-threaded to receive a valve cage 40 which supports a spring pressed ball check valve 41. A spring 42 is interposed between each piston wearpiece and its valve cage, said spring urging the respective wearpieces into constant engagement with the operating lever or arm 35a.

Valves 41 act as replenishing devices for the respective chambers 35 and 36, these valves permitting fluid to flow from the reservoir 28 into their respective chambers as the piston head portions move to increase the cubical area of the respective compression chambers.

Transverse passages 43, provided by the piston head portions and their respective wearpieces, furnish communication between the reservoir 28 and the chambers containing the springs 42 of the respective piston heads.

Figure 4:
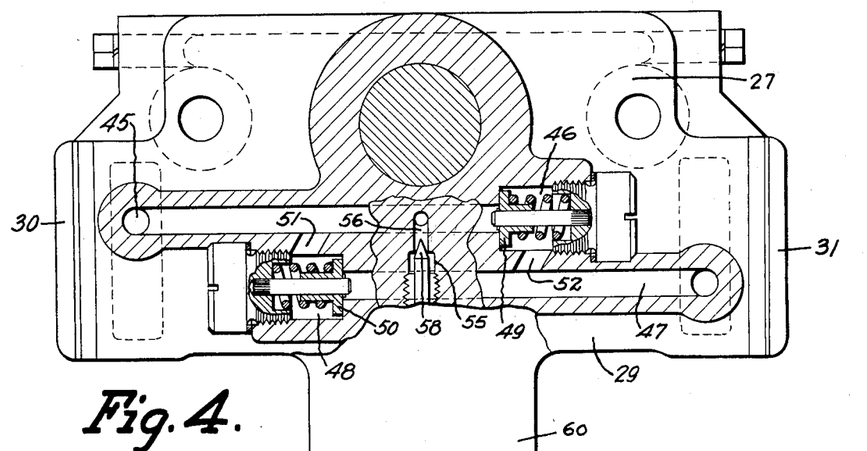
Fig. 4 is a fragmentary view, partly in section and partly in elevation, taken substantially along the line 4—4 of Fig. 3.

Referring particularly to the Fig. 4, it may be seen that a duct 45 leads from the spring compression control chamber 35 to a valve chamber 46. A similar duct 47 leads from the spring rebound control chamber 36 to a valve chamber 48. The valve chambers 46 and 48 are provided with spring loaded, pressure release valves 49 and 50 respectively which normally cut off communication between the ducts 45 and 47 and their respective valve chambers 46 and 48. However, said valves are operable by fluid pressure to complete communication between the ducts and their respective valve chambers.

It will be seen that the duct 45 is in communication with the valve chamber 48, on the exhaust side of the valve 50, through a transverse passage 51, while a similar passage 52 provides communication between the exhaust side of the valve chamber 46 and the duct 47. Thus, fluid pressure in the duct 45, directed through cross passage 51, will tend to urge the valve 50 more tightly upon its seat, said pressure, however, when moving valve 49 from its seat against the effect of its spring, provides a fluid flow into the valve chamber 46, thence through passage 52 into duct 47, from whence the fluid may flow into the opposite compression chamber 36. The opposite is true when fluid pressure is provided within the duct 47, this fluid pressure moving valve 50 from its seat and thereby establishing a flow through passage 51 and duct 45 into the opposite chamber 35. Valves 49 and 50 may be termed the "pressure release" or "pop-off" valves for the respective spring compression control and spring rebound control chambers 35 and 36.

Figures 2, 3:
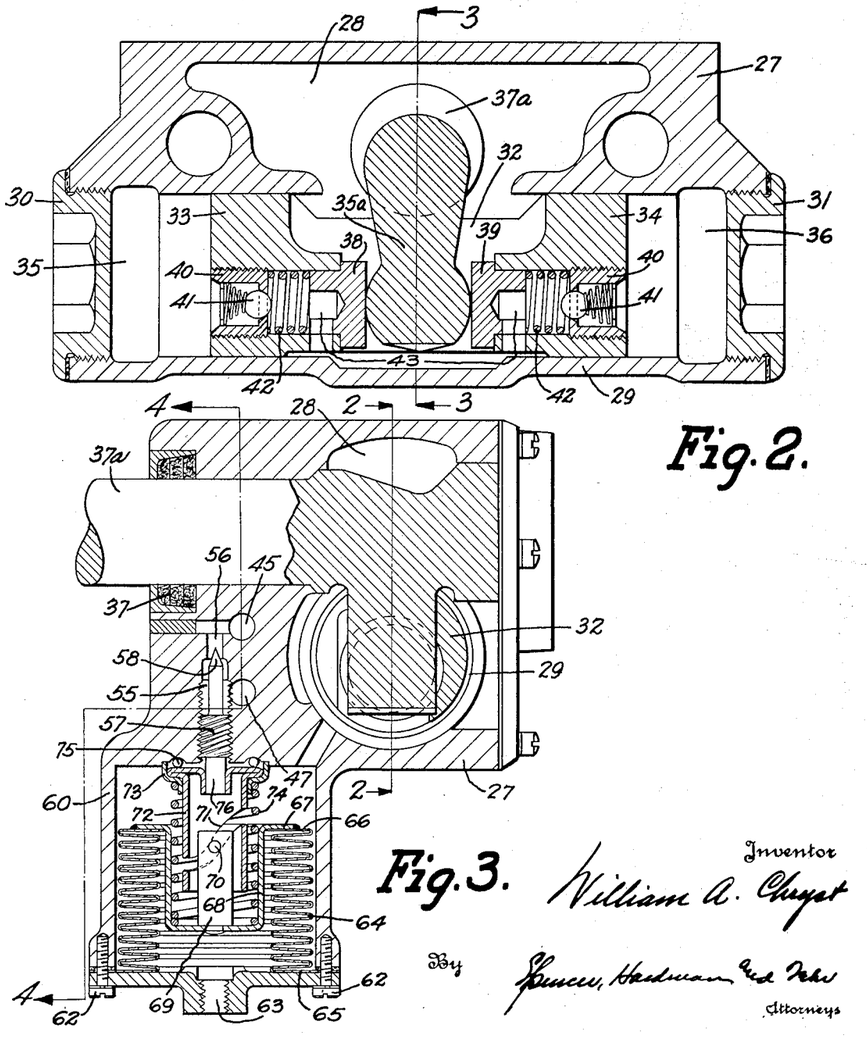
Fig. 2 is a longitudinal sectional view of a shock absorber of the device, the view being taken substantially along the line 2—2 of Fig. 3.
Fig. 3 is a cross sectional view of the sock absorber taken substantially along the line 3—3 of Fig. 2.

As shown in Figs. 3 and 4, ducts 45 and 47 are connected by a bypass 55, the portion 56 thereof being restricted or of less diameter than the portion which is provided with interior screw threads.

The interior screw-threaded portion of this by-pass receives the screw shank of a metering pin 57. This metering pin has a tapered end 58 which, by turning of the metering pin, is caused to move toward or away from the restricted portion 56, thus controlling the restriction to the flow of fluid through said portion 56. As the metering pin is screwed toward the restricted portion 56, the tapered portion 58 of the pin will decrease the orifice presented at the restricted portion 56 and thus the fluid flow through this portion is restricted to a greater degree than it would be if the metering pin were screwed in the opposite direction and the tapered portion thereof be moved away from the restricted portion 56 of the passage.

The casing 23 of each shock absorber has a cylindrical extension or housing portion 60 which contains the hydraulically operated actuator mechanism for the fluid flow controlling device or metering pin 57 of the shock absorber. The housing 60 has a cover cap 61 attached thereto by screws 62. This cover cap has a central aperture 63 interiorly threaded to receive pipes or conduits as will be described.

An expansible member 64, shown in the form of a metallic bellows, has the fold 65 at its one end attached to the cap or cover plate 61 so that a hermetic seal is provided between the cap and said end fold 65. The opposite end fold 66 of the bellows 64 is hermetically attached to the outwardly extending flange 67 of a cup-shaped member 68 which extends downwardly into the bellows 64 as shown in Fig. 3 and has its bottom end wall supporting a central stud 69. This central stud carries a transverse pin 70, the ends of which extend from diametrically opposite sides of said stud 69 and enter into diametrically opposite spiral slots 71 provided in the wall of the tubular body portion of the actuator 72. The actuator 72 is rotatably attached to the casing 23 by a retainer collar 73 which is maintained in engagement with the casing 23 by a spring 74 interposed between the retainer collar 73 and the bottom wall of the cup-shaped member 68. This spring not only serves to maintain the retainer collar 73 against the casing 23, but it also yieldably urges the bellows 64 into non-collapsed position due to the pressure on the cup-shaped member 68. A ball bearing 75 is interposed between the head of the actuator 72 and the casing 23 and forms an end thrust bearing for the actuator 72. The head of the actuator is pierced centrally, the opening being preferably rectangular in shape so as to receive the rectangular end 76 of the metering pin 57 whereby rotation of the actuator will rotate the metering pin 57, the screw threads thereon, causing it to move longitudinally, which movement of the metering pin 57, relative to the actuator 72, is thus provided for. The longitudinal movement of the member 68 and its stud 69, due to expansion or contraction of the bellows 64, moves the transverse pin 70 against an edge of the spiral slot 71, thus the actuator 72 will be rotated in one direction or the other, depending on the upward or downward movement of the stud 69, thereby rotating the metering pin 57 in one direction or the other to increase or decrease the restriction to the flow of fluid through the by-pass 56. Specifically, as the bellows 64 is expanded, the stud 69 will be moved upwardly against the upper surface of the spiral slot 71, thereby rotating the actuator 72 and consequently the pin 57, so that said pin is turned in a direction in which the tapered end 58 thereof will be moved toward the restricted portion 56 and consequently the fluid flow through the bypass will be increasingly restricted in accordance with the upward movement of the bellows and the stud 69.

The adjusting device of the fluid flow controlling element of the respective shock absorbers having been described, the device for moving said adjusting device of all of the shock absorbers will now be described.

Figure 7:
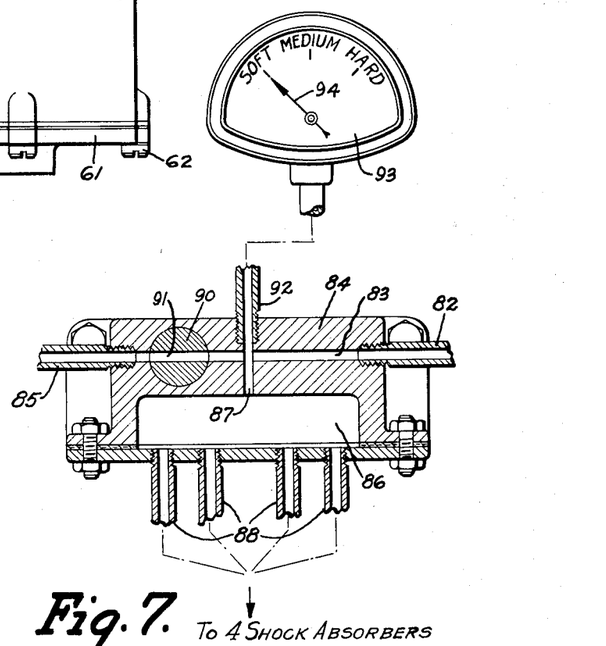
Fig. 7 is a detail sectional view of the fluid pressure reservoir and the indicator therefor.

Referring particularly to the Fig. 5, the numeral 80 designates the engine of the vehicle which is provided with an oil pump 81, driven in any suitable manner by the engine. The oil pump 81 is arranged to draw oil from the oil sump of the engine and deliver it under pressure to a pipe 82 which is connected with one end of a passage 83 formed in the fluid pressure reservoir casing 84. Flowing through the passage 83 this oil may be directed back to the engine oil sump through the pipe 85, as shown in Fig. 7. The casing 84 has a chamber 86 which is in communication with passage 83 through channel 87. Chamber 86 is the fluid pressure reservoir and has pipes 88 leading from it to the threaded opening 63 of the control bellows 64 of the respective shock absorbers. In the casing 84 there is a transverse recess communicating with passage 83, said recess receiving the fluid pressure regulating valve 90 which has a transverse passage 91 normally yieldably maintained in alignment with the passage 83 in the casing 84 as shown in Fig. 7. Disalignment of the passage 91 of the valve 90 will obstruct the flow of fluid under pressure from pipe 82 through passage 83 into pipe 85, thus creating a back pressure in the reservoir 86 through the channel 87. A pipe 92 leading from the passage 83, on the intake side of valve 90, connects with an indicator 93 whose finger 94, operated by fluid pressure, will indicate whether the pressure within the chamber 86 is such as to provide a soft, a medium or a hard ride by the shock absorbers.

Figure 6:
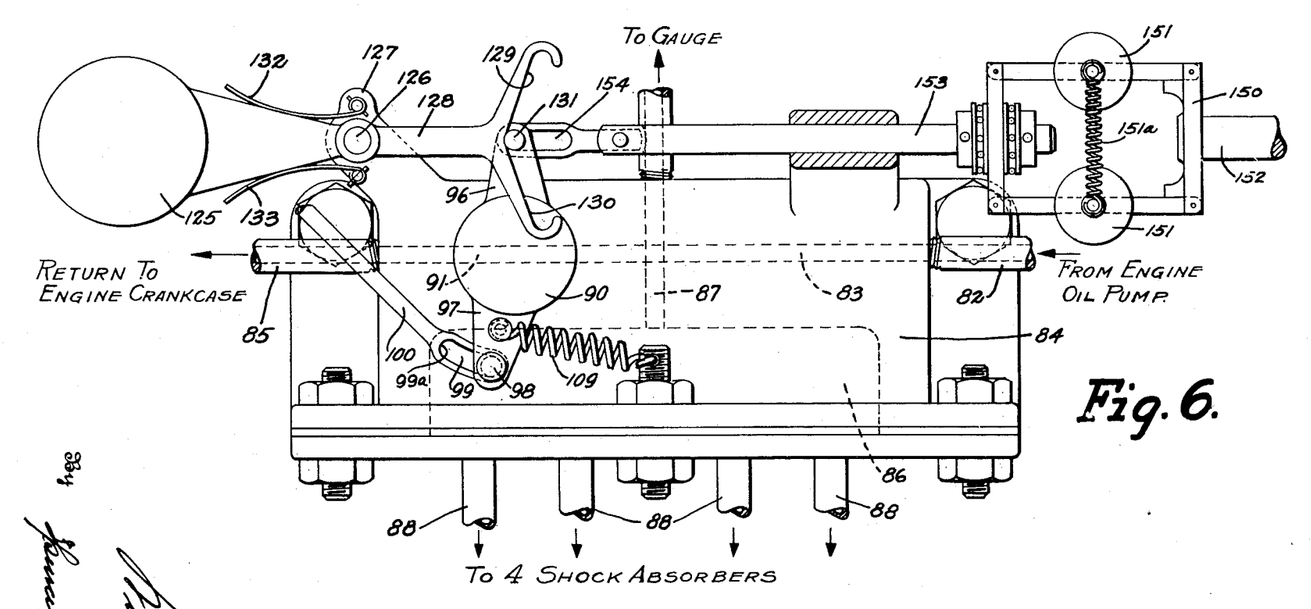
Fig. 6 is a side view of the control mechanisms of the device shown in enlarged scale.
Figure 8:
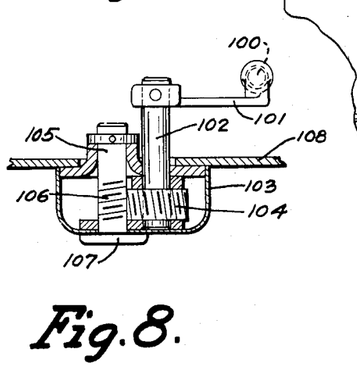
Fig. 8 is a fragmentary, sectional view of the manually operable member.
Figure 9:
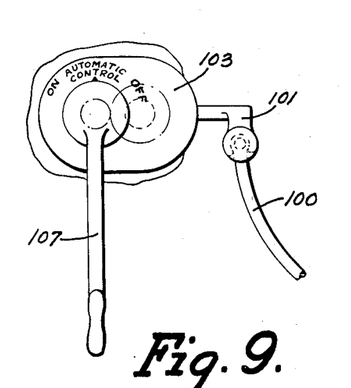
Fig. 9 is a front view of the member shown in Fig. 8.

In Fig. 6, which is of a greatly enlarged scale and mostly diagrammatic in its character, is shown the fluid pressure control valve 90 having diametrically opposite ears 96 and 97 extending therefrom. The ear 97 of the valve has a pin 98 which is received by an elongated slot 99 at one end of the rod 100. The other end of this rod 100 as shown in Figs. 8 and 9, is attached to a rotating arm 101 which is secured to a shaft 102 extending into and journalled within a housing 103, said shaft having a worm gear 104 attached thereto within said housing. A stub shaft 105 rotatably supported by said housing is provided with a worm 106 cooperating with the worm gear 104. Shaft 105 extends outside the housing 103 and has an operating handle 107 provided thereon. The housing 103 may be attached to the dash 108 of the vehicle within easy reach of the operator of the vehicle so that he may grip the operating handle 107 and rotate it whereby the worm 106 will rotate worm gear 104 and thereby rotate the lever 101 through the shaft 102. If the handle 107 is rotated counter-clockwise toward the word "On" on the dial of casing 103, then the arm 101 will pull the rod 100 upwardly whereby the control valve 90 is moved clockwise as regards Fig. 6 out of its normal position, in which position it is yieldably urged by a spring 109 interposed between an ear of the valve 90 and any suitable anchoring member on the device. If the operating member or lever 107 is moved clockwise as regards Fig. 9 toward the "Off" indication on the casing 103, then the rod 100 is pushed downwardly whereby the slot 99 is moved so that its upper end 99a approaches pin 98. If the upper end 99a of the slot engages pin 98, then the valve 90 is locked against any movement out of its normal position. It may be seen that the rod 100 may be moved into any intermediate position, thereby limiting the movement of the valve 90 out of its normal position into a position in which the fluid flowing through passage 83 will be throttled.

The manual control of the fluid pressure control valve 90 having been described, an automatic control of this valve will now be described, this automatic control adjusting the valve in accordance with the nature of the surface of the roadway over which the vehicle is being operated.

This automatic device comprises an inertia weight member 125, carried by an arm which is pivotally supported by the pin 126 which is carried on an angular member 127 of the casing 84. An extension 128 of the weight supporting arm has a Y-shaped end presenting the camming surfaces 129 and 130 which are engaged by pin 131 carried on the ear 96 of the valve 90. Springs 132 and 133, anchored at one end to the casing extension 127, engage opposite sides of the weight supporting arm and thereby maintain the weight 125 in normal intermediate position so that the intermediate point between camming surfaces 129 and 130 is normally engaged by the pin 131.

The striking of obstructions or ruts in the surface of the highway will cause oscillations of the vehicle body and, thus oscillations of the weight 125 and, due to these oscillations, camming surfaces 129 and 130 will move the pin 131 so as to rotate the valve 90 clockwise against the effect of its spring 109 and thereby disalign its passage 91 with the passage 83, consequently throttling the fluid flow through the passage 83 and thereby creating a back pressure within the compression chamber 86 in accordance with the amplitude of the oscillations of the body of the vehicle, which is carried on the frame 20.

It will be seen that as the inertia weight operated camming members 129 and 130 move the valve 90 clockwise the pin 98 may travel in the slot 99 of the manually operated rod 100 to its full degree if the rod 100 is moved to its normal intermediate position. If the rod 100 is moved toward the "Off" position or downwardly, then the range of inertia weight control is limited for as soon as pin 98 engages the end 99a of the slot 99 in the rod 100, then movement of the valve 90 by the inertia weight is stopped. If the actuating lever 107 is moved toward the "On" position, rod 100 is drawn upwardly, thereby rotating valve 90 in a clockwise direction and thus moving pin 131 away from the inertia weight cam members 129 and 130, and thus oscillations of the weight within certain limits will not cause movement of the valve 90. However, if the oscillations of the weight member are of sufficient extent, then the camming portions 129 and 130 in said weight operated device will engage pin 131 and move it from its adjusted position by the hand controlled device toward a greater fluid flow restricting position.

The automatic valve adjusting mechanism which operates in accordance with the speed of the vehicle, comprises a centrifugal governor 150 having weight members 151 urged into normal position by a spring 151a. The governor is driven by a shaft 152 which extends from the oil pump 81 of the engine as shown in Fig. 5. The weights 151 as they are moved outwardly by centrifugal force, exert a pull upon the shaft 153, the free end of which is provided with an elongated slot 154 which receives one end of the pin 131 carried by the ear 96 of the valve 90. It will be seen that as the speed of the vehicle increases, weights 151 will fly outwardly, pulling upon the shaft or rod 153, thereby moving the valve 90 in a clockwise direction against the effect of its spring 109 which, as has been described, disaligns the passage 91 of the valve with the passage 83 and by thus throttling the fluid flow through said passage, creates a back pressure on the reservoir 86.

Again it will be seen that if the hand-controlled mechanism rotates the valve 90 into a given position, the centrifugal member may operate within a range without affecting the valve. However, as soon as the point of adjustment by the hand control is reached, the centrifugal control may move the valve the remaining portion of its adjustment range. However, if the hand control is moved to "Off" position, then the valve 90, as has been mentioned, is locked against movement and the centrifugal governor 150 is ineffective to move the valve 90 out of its normal position.

From the aforegoing it may be seen that when the road wheels of the vehicle strike an obstruction in the roadway, the axles represented by the numerals 21 and 21a are moved toward the frame 20 and thus the link connections between the axles and the shock absorbers will move the pistons 32 of the respective shock absorbers to exert pressure on the fluid within the compression control chambers 35 of the respective shock absorbers. The initial flow of this fluid from the chambers 35 is through duct 45, by-pass 55 into duct 47 and into the opposite or spring rebound control chambers 36 of the respective shock absorbers.

If the roadway is smooth, it is advisable to permit the springs of the vehicle to absorb the slight shocks, and thus the shock absorbers should offer little or no resistance. Under these conditions the restriction offered by the metering pins 57 of the respective shock absorber should be at a minimum and consequently the metering pins 57 should be screwed away from the restricted portions 56 of the respective by-passes of the shock absorbers as far as possible. To effect such adjustment of the metering pins, no pressure should be directed to the respective bellows of the shock absorbers and thus the valve 90 of the control device should be in its normal position. To obtain such a free ride, the hand operated lever 107 should be moved toward the "Off" position as marked on the casing 103, in which position rod 100 locks the valve 90 in the free fluid flow position as shown in Fig. 7.

Should the surface of the roadway become rougher, that is, if the roadway has ruts or bumps and it is desired to stiffen the ride by instituting shock absorber control, then the hand control lever 107 should be moved to its intermediate or "automatic control" position as shown in Fig. 9, at which time rod 100 is in a position as shown in Fig. 6, thereby permitting the automatic mechanisms, including the inertia weight member 125 and the speed governor 150, to become effective.

If it is desired to adjust the operation of the shock absorbers by hand, then the hand-operated element 107 is moved toward the "On" position which causes rod 100 to move valve 90 clockwise into the desired position in which its passage 91 provides constant restriction to the flow of fluid through passage 83 and thereby provides a certain back pressure in the reservoir 86. The restriction, however, may be increased by the automatic devices if the oscillations of the frame of the vehicle or the speed thereof are increased.

It will be understood that the fluid pressure within the reservoir 86 is directed through pipes 88 to the respective bellows 64 of the shock absorbers, causing said bellows to expand the proper amount and thereby causing the metering pins 57 to be screwed toward the restricted position a proper amount.

In this invention applicant has provided a set of shock absorbers for controlling the relative movements between the frame and axles of a vehicle, said shock absorbers being under the direct control of the operator who, if he desires, may entirely eliminate the automatic control or may adjust the device so that the shock absorbers are controlled automatically in accordance with either the surface of the road over which the vehicle is being operated or in accordance with the speed at which the vehicle is running.

While the form of embodiment of the present invention as herein disclosed, constitutes a preferred form, it is to be understood that other forms might be adopted, all coming within the scope of the claims which follow:

What is claimed is as follows:

1. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; and automatic means for regulating the power controlling member in accordance with the nature of the road over which the vehicle is being operated.

2. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; and an inertia weight controlled device for automatically adjusting said member to control the power applied to the adjustable means in accordance with the nature of the road over which the vehicle is being operated.

3. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; means controlled by the speed of the vehicle for automatically adjusting the power controlling member; and an inertia member adapted automatically to adjust said power controlling member in accordance with the nature of the road over which the vehicle is being operated.

4. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; a hand operated device for adjusting said member to vary the power applied to the adjustable means; and automatic means for adjusting said member in accordance with the nature of the road over which the vehicle is being operated.

5. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; a hand operated device for adjusting said member to vary the power applied to the adjustable means; and an inertia weight device adapted automatically to adjust said member beyond the point of adjustment by the hand operated device, in accordance with the nature of the road over which the vehicle is being operated.

6. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; a hand operated device for adjusting said member to vary the power applied to the adjustable means; and means adapted automatically to adjust said power controlling member in accordance with the speed of the vehicle.

7. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; a hand operated device for adjusting said member to vary the power applied to the adjustable means; and a centrifugal governor adapted automatically to adjust said power controlling member beyond the point of adjustment by the hand operated device, in accordance with the speed of the vehicle.

8. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling members; a hand operated device for adjusting said member to vary the power applied to the adjustable means; automatic means for adjusting said member in accordance with the nature of the road over which the vehicle is being operated; and automatic means for adjusting said member in accordance with the speed of the vehicle.

9. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power for operating said means; a power controlling member; and control means for adjusting said power controlling member to vary the position of the adjustable means in all of the shock absorbers, said control means comprising an independently acting manually operable member, an inertia weight operated device and a centrifugal governor.

10. A device for controlling the relative movements of the frame and axles of an engine driven vehicle comprising, in combination, hydraulic shock absorbers connected between the frame and the respective axles; fluid flow controlling means in each shock absorber; hydraulically operated means for adjusting each fluid flow controlling means to vary the resisting efforts of the respective shock absorbers; a source of fluid, under pressure, connected with the said hydraulically operated means; a control device for said fluid pressure; and an inertia weight operated device adapted automatically to adjust the fluid pressure control device in accordance with the degree of irregularities in the road over which the vehicle is being operated.

11. A device for controlling the relative movements of the frame and axles of an engine driven vehicle comprising, in combination, hydraulic shock absorbers connected between the frame and the respective axles; fluid flow controlling means in each shock absorber; hydraulically operated means for adjusting each fluid flow controlling means to vary the resisting efforts of the respective shock absorbers; a source of fluid, under pressure, connected with the said hydraulically operated means; a control device for said fluid pressure; and a multiple control device connected with the fluid pressure control device for adjusting it to vary the fluid pressure directed to the shock absorbers, said multiple control device consisting of a manually operable lever, an inertia weight operated member and a centrifugal governor, each adapted to adjust the fluid flow control device toward the extreme position in which the shock absorbers will provide their maximum resistance to body and axle movements, independently of the adjustment of said fluid flow control device toward said position by the other members of the multiple control device.

12. A device for controlling the relative movements of the frame and axles of an engine driven vehicle comprising, in combination, hydraulic shock absorbers connected between the frame and axles; a fluid flow controlling device in each shock absorber; a hydraulically operated actuator for the fluid flow controlling device of each shock absorber adapted to adjust the device to vary the resisting effort of the shock absorber; a reservoir adapted to be provided with fluid under pressure by the engine; a valve for controlling the pressure in said reservoir; means connecting the hydraulically operated actuator of each shock absorber with the reservoir; and means for adjusting the valve said means consisting of a hand operated lever for manual adjustment and an inertia weight for automatic adjustment, each operating independently of the other.

13. A device for controlling the relative movements of the frame and axles of an engine driven vehicle comprising, in combination, hydraulic shock absorbers connected between the frame and axles; a fluid flow controlling device in each shock absorber; a hydraulically operated actuator for the fluid flow controlling device of each shock absorber adapted to adjust the device to vary the resisting effort of the shock absorber; a reservoir adapted to be provided with fluid under pressure by the engine; a valve for controlling the pressure in said reservoir; means connecting the hydraulically operated actuator of each shock absorber with the reservoir; and mechanism for adjusting the valve to increase fluid pressure within the reservoir, said mechanism comprising a hand operated lever for manual adjustment, and an inertia weight and a centrifugal governor for automatic adjustment, each being adapted to adjust the valve independently of the other.

14. A device for controlling the relative movements of the frame and axle of an engine driven vehicle comprising, in combination, hydraulic shock absorbers connected between the frame and axles of the vehicle; a fluid flow controlling device in each shock absorber, adjustable to vary the resisting efforts of the shock absorber; an actuator for said device; hydraulically operable means on each shock absorber for moving the actuator; a fluid reservoir; a pump driven by the engine of the vehicle and adapted to deliver oil from the engine to the reservoir under pressure; a valve for controlling said oil delivery to vary the fluid pressure in the reservoir; pipes connecting the reservoir with the hydraulically operable means of each shock absorber; and an inertia weight operated device connected to said valve, adapted automatically to adjust the valve in accordance with the nature of the road surface over which the vehicle is being operated.

15. A device for controlling the relative movements of the frame and axle of an engine driven vehicle, comprising, in combination, hydraulic shock absorbers connected between the frame and axles of the vehicle; a fluid flow controlling device in each shock absorber, adjustable to vary the resisting efforts of the shock absorber; an actuator for said device; hydraulically operable means on each shock absorber for moving the actuator; a fluid reservoir; a pump driven by the engine of the vehicle and adapted to deliver oil from the engine to the reservoir under pressure; a valve for controlling said oil delivery to vary the fluid pressure in the reservoir; pipes connecting the reservoir with the hydraulically operable means of each shock absorber; and automatically operated means connected with the valve for adjusting it to control oil delivery to the reservoir, said means comprising an inertia weight operated member and a centrifugal governor, each adapted to move the valve independently of the other.

16. A device for controlling the relative movements of the frame and axles of a vehicle comprising, in combination, shock absorbers connected between said frame and axles; a fluid flow control device in each shock absorber; actuators for adjusting each of said devices to vary the resisting efforts of the respective shock absorbers; power operated means for moving the actuators; a source of power connected to the various power operated means; a controller for regulating the application of the power to said means, said controller being yieldably urged into a normal position, in which substantially no power is applied to said means; means adapted automatically to move the controller to increase the power application to the power operated means; and a manually operable means movable in one direction to shift the controller in the same direction as does the said automatic means, and movable in the opposite direction to lock the controller against movement by said automatic means.

17. A device for controlling the relative movements of the frame and axles of a vehicle comprising, in combination, shock absorbers connected between said frame and axles; a fluid flow control device in each shock absorber; actuators for adjusting each of said devices to vary the resisting efforts of the respective shock absorbers; power operated means for moving the actuators; a source of power connected to the various power operated means; a controller for regulating the application of the power to said means; said controller being yieldably urged into a normal position, in which substantially no power is applied to said means; means adapted automatically to move the controller to increase the power application to the power operated means; and a manually operable means movable in one direction to shift the controller in the same direction as does the said automatic means, and movable in the opposite direction to limit the movement of the controller by said automatic means.

18. A device for controlling the relative movements of the frame and axles of a vehicle comprising, in combination, shock absorbers connected between said frame and axles; a fluid flow control device in each shock absorber; actuators for adjusting each of said devices to vary the resisting efforts of the respective shock absorbers; a fluid pressure operated means connected with each actuator for moving it; a source of fluid pressure connected with the aforementioned means; a valve, adjustable to regulate the application of the fluid pressure to said means; means yieldably maintaining said valve in normal position in which a minimum fluid pressure is exerted on said means; an inertia weight operated lever engaging the valve and adapted to move it out of normal position to increase fluid pressure application on said means in accordance with the irregularities in the road surface over which the vehicle is being operated; and a hand operated lever connected with the valve, adapted to move said valve to control the application of fluid pressure, said lever being operable also to limit or prevent the movement of the valve by the inertia weight operated lever.

19. A device for controlling the relative movements of the frame and axles of a vehicle comprising, in combination, shock absorbers connected between said frame and axles; a fluid flow control device in each shock absorber; actuators for adusting each of said devices to vary the resisting efforts of the respective shock absorbers; a fluid pressure operated means connected with each actuator for moving it; a source of fluid pressure connected with the aforementioned means; a valve, adjustable to regulate the application of the fluid pressure to said means; means yieldably maintaining said valve in normal position in which a minimum fluid pressure is exerted on said means; automatically operable devices engaging the valve and adapted to move said valve out of normal position to increase fluid pressure application, said devices comprising an inertia weight operated lever and a centrifugal governor operated link both operating on said valve independently of the other; and a hand operated rod connected to the valve and adapted to move said valve out of the normal position independently of the automatic devices, said rod however being operable to prevent or limit the movement of the valve by the said automatic devices.

20. A device for controlling the movements of a spring which supports the frame of a vehicle upon the vehicle axle, comprising, a shock absorber having parts attached respectively to said vehicle frame and axle; mechanism for adjusting said shock absorber to vary the control over the vehicle spring; manually operated means for regulating said adjusting mechanism; and an inertia member adapted automatically to regulate said adjusting mechanism in accordance with the nature of the road over which the vehicle is being operated.

21. A device for controlling the movements of a spring which supports the frame of a vehicle upon the vehicle axle, comprising, a shock absorber having parts attached respectively to said vehicle frame and axle; mechanism for adjusting said shock absorber to vary its control over the vehicle spring; means adapted to regulate said adjusting mechanism in accordance with the speed of the vehicle and an inertia member adapted automatically to regulate said adjusting mechanism in accordance with the nature of the road over which the vehicle is being operated.

22. A device for controlling the movements of a spring which supports the frame of a vehicle upon the vehicle axle, comprising, a shock absorber having parts attached respectively to said vehicle frame and axle; mechanism for adjusting said shock absorber to vary its control over the vehicle spring; means adapted to regulate said adjusting mechanism in accordance with the speed of the vehicle; an inertia member adapted automatically to regulate said adjusting mechanism in accordance with the nature of the road over which the vehicle is being operated; and a manually operable member for regulating said adjusting mechanism regardless of its regulation by the speed and the inertia member.

23. A device for controlling the relative movements of the frame and axles of a vehicle comprising, in combination, shock absorbers connected between the frame and axles; adjustable means in the shock absorbers adapted to be moved to vary the resisting efforts of the shock absorbers to the frame and axle movements; a source of power available only while the vehicle is in operation; a power controlling member; and automatic means for regulating the power controlling member in accordance with the nature of the road over which the vehicle is being operated.

24. A device for controlling the relative movements of the frame and axles of a vehicle, comprising, in combination, shock absorbers connected between the frame and axles; adjustable means in the shock absorbers adapted to be moved to vary the resisting efforts of the shock absorbers to the frame and axle movements; a source of power available only while the vehicle is in operation; a power controlling member; an inertia weight controlled device adapted automatically to adjust said member in accordance with the nature of the road over which the vehicle is being operated; and speed controlled means adapted to adjust said member in accordance with the speed at which the vehicle is being operated.

25. A device for controlling the relative movements of the frame and axles of an engine driven vehicle comprising, in combination, shock absorbers connected between said frame and axles; adjustable means in said shock absorbers adapted to be actuated to vary the resisting efforts of said shock absorbers to the frame and axle movements; a source of power provided by the engine of the vehicle; a power controlling member; and inertia means adapted automatically to adjust the power controlling member in accordance with the nature of the road over which the vehicle is being operated.

26. A device for controlling the relative movements of the frame and axles of an engine driven vehicle, comprising, in combination, shock absorbers connected between said frame and axles; adjustable means in said shock absorbers adapted to be actuated to vary the resisting efforts of said shock absorbers to the frame and axle movements; a source of power provided by the engine of the vehicle; a power controlling member; and inertia means adapted automatically to adjust the power controlling member in accordance with the oscillations of the frame of the vehicle.

27. A device for controlling the relative movements of the frame and axles of an engine driven vehicle, comprising, in combination, shock absorbers connected between said frame and axles; adjustable means in said shock absorbers adapted to be actuated to vary the resisting efforts of said shock absorbers to the frame and axle movements; a source of power provided by the engine of the vehicle; a power controlling member and means adapted automatically to adjust the power controlling member, said means comprising an inertia weight controlled device to effect the adjustment in response to oscillations of the frame of the vehicle and a governor to effect adjustments in accordance with the speed at which the vehicle is being operated.

28. A device for controlling the relative movements of the frame and axles of a vehicle comprising, in combination, hydraulic shock absorbers connected between said frame and axles, each shock absorber having spring loaded pressure release devices; a by-pass valve adjustably supported in each shock absorber and adapted to establish flows of fluid around said devices; a power operated actuator in each shock absorber for adjusting its by-pass valve; a source of power for operating all of said actuators; and automatic means for controlling the application of the power to the actuators in accordance with the speed at which the vehicle is being operated.

29. A device for controlling the relative movements of the frame and axles of a vehicle, comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; and automatic means for controlling the application of the power to the actuator in accordance with the vertical oscillations of the frame of the vehicle.

30. A device for controlling the relative movements of the frame and axles of a vehicle comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; and automatic means for controlling the application of the power to the actuator in accordance with the speed at which the vehicle is being operated, and also in accordance with the vertical oscillations of the frame of the vehicle.

31. A device for controlling the relative movements of the frame and axles of a vehicle comprising, in combination, hydraulic shock absorbers connected between said frame and axles, each shock absorber having spring loaded pressure release devices; an adjustable by-pass valve in each shock absorber adapted to establish flows of fluid around said devices; a power operated actuator in each shock absorber for adjusting said by-pass valve; a source of power for operating said actuators; and a centrifugal governor adapted automatically to control the application of power to the actuators in accordance with the speed at which the vehicle is being operated.

32. A device for controlling the relative movements of the frame and axles of a vehicle comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; and an inertia weight controlled device adapted automatically to regulate the power applied to the actuator in accordance with the vertical oscillations of the frame of the vehicle.

33. A device for controlling the relative movements of the frame and axles of a vehicle comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; a governor adapted automatically to regulate the application of power to the actuator in accordance with the speed of the vehicle; and a manually operable member adapted to adjust the application of power to the actuator regardless of the effect of the governor.

34. A device for controlling the relative movements of the frame and axles of a vehicle comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; an inertia weight operated device adapted automatically to regulate the power application to the actuator in accordance with the acceleration to the vertical oscillations of the frame of the vehicle; and a manually operated member for regulating said power application regardless of the effect of the inertia weight operated device.

35. A device for controlling the relative movements of the frame and axles of a vehicle comprising, in combination, hydraulic shock absorbers connected between said frame and axles, each shock absorber having spring loaded pressure release devices and an adjustable by-pass valve adapted to establish flows of fluid around said devices; a power operated actuator for adjusting said by-pass valve; a source of power for operating said actuator; a governor adapted automatically to regulate the application of power to the actuator in accordance with the speed of the vehicle; an inertia weight operated device adapted automatically to adjust the power application to the actuator in accordance with the vertical oscillations of the vehicle frame; and a manually operated device for regulating said power application regardless of the effect of the governor or inertia weight operated device.

36. A control device for hydraulic shock absorbers having a fluid circulating system and a valve for regulating said fluid circulation, an actuator rotatably supported in said shock absorber and operatively connected to said valve; a fluid pressure operated member movable only linearly of the axis of said actuator; and a motion transmitting connection between said member and actuator for causing the linear movement of said member to turn the actuator.

37. A control device for hydraulic shock absorbers having a fluid circulating system and a valve for regulating said fluid circulation, an actuator rotatably supported in said shock absorber and operatively connected to said valve, said actuator having a spiral slot; a fluid pressure operated member movable linearly of the axis of said actuator; and means on said member engaging the slot of the actuator for rotating it in response to movement of said member.

38. A control device for hydraulic shock absorbers having a fluid circulating system and a valve for regulating said fluid circulation; an actuator rotatably supported in said shock absorber and operatively connected to said valve, said actuator having a tubular portion; oppositely disposed, spiral slots in said tubular portion; a fluid pressure operated member movable linearly of the axis of said actuator; a standard carried by said member and extending into the tubular portion of the actuator; and means extending radially from said standard into the spiral slots of the actuator.

39. A control device for hydraulic shock absorbers having a fluid circulating system and a valve for regulating said fluid circulation; a fluid pressure operated member comprising a circularly shaped bellows having a cup-shaped end member, provided with an outwardly extending flange which is hermetically attached to the bellows, the cup portion of said end member extending into the bellows; a standard carried by said cup portion substantially concentrically thereof; oppositely disposed lugs extending radially from the standard; an actuator rotatably carried in the shock absorber and connected with the valve, said actuator having a tubular portion extending into the cup portion of the bellows end member and receiving the standard on said end member, the tubular portion of the actuator having oppositely disposed spiral slots which receive the lugs on the standard operatively connecting the fluid pressure operated member with the valve actuator.

WILLIAM A. CHRYST.